US010717030B2

(12) United States Patent
Stein et al.

(10) Patent No.: US 10,717,030 B2
(45) Date of Patent: Jul. 21, 2020

(54) SEPARATING DEVICE

(71) Applicant: THYSSENKRUPP PRESTA TECCENTER AG, Eschen (LI)

(72) Inventors: Tony Stein, Geithain (DE); Ulf Müller, Chemnitz (DE); Robert Reichelt, Niederwiesa (DE)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 224 days.

(21) Appl. No.: 15/766,048

(22) PCT Filed: Sep. 20, 2016

(86) PCT No.: PCT/EP2016/072268
§ 371 (c)(1),
(2) Date: Apr. 5, 2018

(87) PCT Pub. No.: WO2017/060071
PCT Pub. Date: Apr. 13, 2017

(65) Prior Publication Data
US 2019/0111369 A1 Apr. 18, 2019

(30) Foreign Application Priority Data
Oct. 6, 2015 (DE) .......................... 10 2015 117 013

(51) Int. Cl.
*B01D 45/16* (2006.01)
*B01D 45/06* (2006.01)
*B01D 45/08* (2006.01)

(52) U.S. Cl.
CPC ............. *B01D 45/06* (2013.01); *B01D 45/08* (2013.01); *B01D 45/16* (2013.01); *B01D 2277/10* (2013.01)

(58) Field of Classification Search
CPC ................................. B01D 45/12; B01D 45/16
(Continued)

(56) References Cited

U.S. PATENT DOCUMENTS 4,666,476 A * 5/1987 Reeve ................ B01D 19/0057
55/345
2011/0048696 A1* 3/2011 Holte ................. B01D 19/0057
166/105.5

FOREIGN PATENT DOCUMENTS

DE        10320215 A     12/2004
DE      102004016742 B    9/2005
(Continued)

OTHER PUBLICATIONS

English Translation of International Search Report issued in PCT/EP2016/072268, dated Dec. 19, 2016 (mailed Jan. 4, 2017).

*Primary Examiner* — Robert A Hopkins
(74) *Attorney, Agent, or Firm* — thyssenkrupp North America, LLC

(57) ABSTRACT

A device for separating liquid from a volume flow of a gas-liquid mixture may include a separating element and a deflection arrangement for deflecting the volume flow in a direction of the separating element to precipitate liquid on the separating element and thereby separate the liquid. The deflection arrangement may comprise a flow channel that extends axially away from a volume flow inlet and comprises an aperture area that extends axially on the flow channel. The aperture area may be at least partly covered by a covering means that is movable relative to the aperture area. The covering means may be movable to different extents at two axially-spaced locations to influence a magnitude of a part volume flow of the deflected volume flow flowing out of the flow channel through the aperture area at one axial location differently than at another axial location.

18 Claims, 6 Drawing Sheets

(58) Field of Classification Search
USPC .......................................... 55/394, 396, 456
See application file for complete search history.

(56) References Cited

FOREIGN PATENT DOCUMENTS

| | | | |
|---|---|---|---|
| DE | 102007058059 | A | 8/2008 |
| DE | 102013106332 | A | 12/2014 |
| DE | 102013106334 | | 12/2014 |
| DE | 102013111955 | A | 4/2015 |
| EP | 1924335 | B | 5/2008 |
| EP | 2087213 | A | 8/2009 |
| WO | 2014202198 | A | 12/2014 |

\* cited by examiner

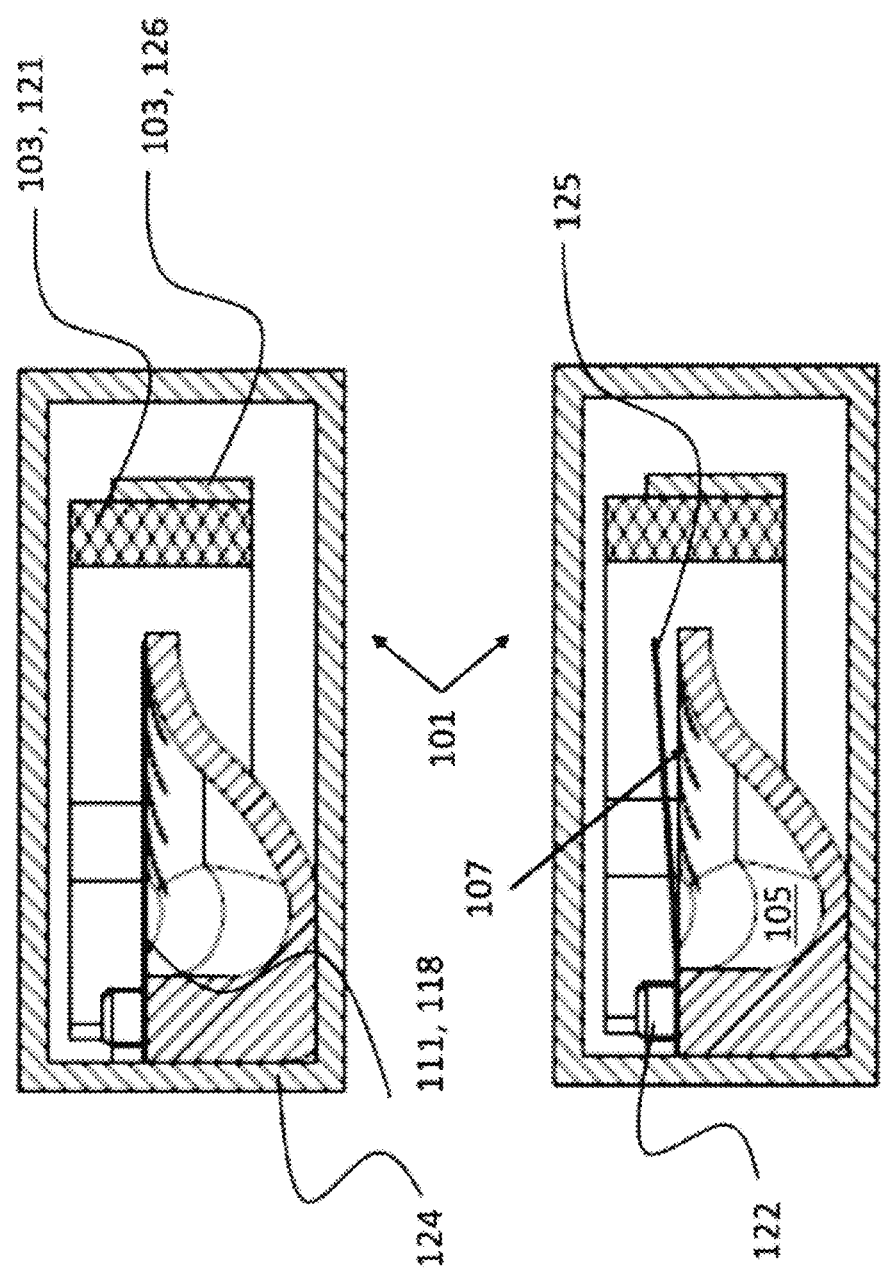

SEPARATING DEVICE

CROSS REFERENCE TO RELATED APPLICATIONS

This application is a U.S. National Stage Entry of International Patent Application Serial Number PCT/EP2016/072268, filed Sep. 20, 2016, which claims priority to German Patent Application No. DE 10 2015 117 013.2, filed Oct. 6, 2015, the entire contents of both of which are incorporated herein by reference.

FIELD

The present disclosure generally relates to separating devices, including devices for separating liquid from volume flows of gas-liquid mixtures.

BACKGROUND

Separating devices are variously employed, in particular to separate oil from a fluid flow. For example, the oil separation from the so-called blow-by gas is an ever more important part of the crankcase ventilation system in the internal combustion engine since, on the one hand, downsizing measures have an effect on the quantity and aerosol composition of the blow-by gas while, on the other hand, intensified laws on emissions accelerate the demands on oil separating systems.

During the combustion process, blow-by gas escapes through the design-related gap between piston (ring) and cylinder wall from the combustion chamber into the crankcase or along the valve stem seals into the valve space. It contains, inter alia, engine oil, fuel remnants and condensate in the form of aerosols. This gas mixture has to be discharged from the crankcase in a controlled manner and again fed to the intake tract and thus to the combustion process in a closed circuit.

In order to keep the separating performance via the volume flow of the gas-liquid mixture at a high level in as uniform a manner as possible, switchable separating systems are mostly employed. These often comprise rigid nozzle cross sections for accelerating the gas-liquid mixture against a baffle wall or a separating medium and are combined with a spring element which opens additional nozzle cross sections as a function of the volume flow. For example, spring elements in the prior art are configured as valve platelets which at the end of a tube-like geometry fixed to the housing combined with the same form a variable nozzle cross section in the form of an annular gap. In order for a flow to flow against an adequately large area of a separating element such as in particular a baffle wall, baffle surface or a separating medium, comparatively large circumferences are necessary in many cases, which disadvantageously results in a large radial installation space. An example for such an oil separating device is disclosed in DE 103 20 215 B4. EP 2 087 213 B1 also discloses such a device for separating oil particles from the crankcase ventilation gas of an internal combustion engine.

Thus a need exists for a device for separating liquid that requires as small as possible a radial installation space while, with different magnitudes of the volume flow, ensuring oil separation which is as uniform as possible over the baffle area.

BRIEF DESCRIPTION OF THE FIGURES

FIG. 6 is a schematic view illustrating an example operating mode of the example separating device of FIG. 5.

DETAILED DESCRIPTION

Figure 1:
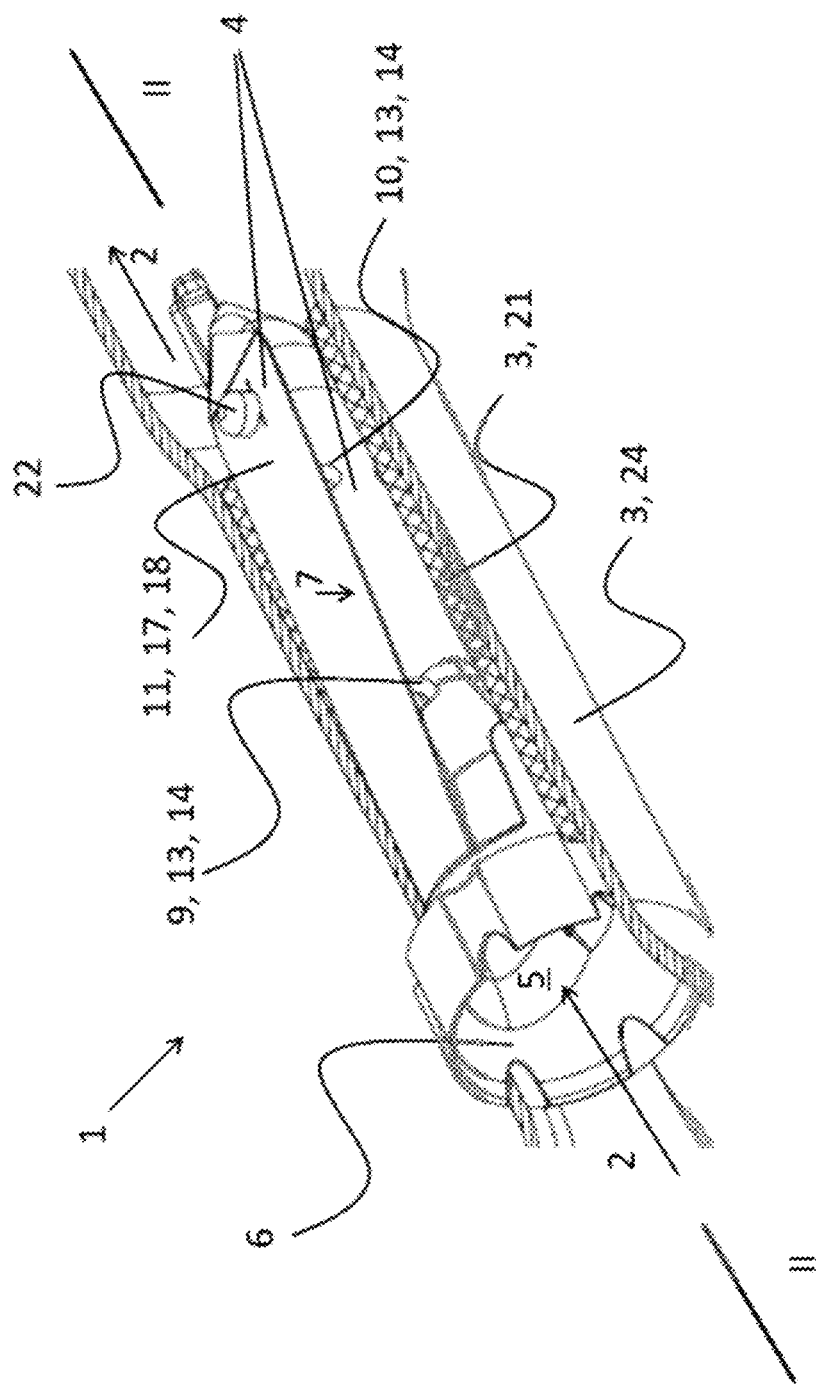
FIG. 1 is a perspective sectional view of an example separating device.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to devices for separating liquid from volume flows of gas-liquid mixtures. In some examples, such a device may include a separating element and a deflection arrangement for deflecting the volume flow in the direction of the separating element in order to precipitate liquid on the separating element and to separate the same from the volume flow in this way. The deflection arrangement may comprise at least one flow channel with a volume flow inlet, and the flow channel may extend axially away from the volume flow inlet and may comprise an aperture area.

Further, in some examples, the aperture area may be arranged so as to extend axially on the flow channel. The aperture area may be designed so as to be at least partly covered by a covering means that is moveable relative to said aperture area, and the covering means may be designed so as to be moveable to different extents at two locations that are axially spaced from one another in order to influence in terms of magnitude a part volume flow of the deflected gas-liquid mixture flowing out of the flow channel through the aperture area at one axial location differently than that at another axial location.

In contrast with the known solutions, the aperture area according to the invention is arranged so as to extend axially on the flow channel. This means that the volume flow is not directly directed at the aperture area but runs approximately parallel to it. This already results in a smaller radial extent of the invention since, for the deflection, the entire or a large part of the axial length of the device can now be used, wherein the axial length can be more easily increased than the radial extent of the device. In order to now state a particularly homogeneous flow field over the axial length of the device and thereby achieve a particularly high separating performance, according to the invention the aperture area is at least partly covered by a covering means that is moveable relative to said aperture area. This means that the covering means is such that it covers the aperture area in terms of area from completely to only slightly. At the same time this also means that the covering means can be designed from lying against the aperture area to being spaced from the latter. An embodiment of the covering means that is incomplete and/or spaced in terms of area results in a certain basic volume flow which, even with a minor volume flow supply to the device, can pass through the aperture area in a deflected manner. Multiple combinations of aperture areas and covering means for each device are also possible according to the invention. The one or the multiple covering means is/are designed so as to influence in terms of magnitude the part of the volume flow flowing out of the flow channel through the aperture area at a given axial location, namely such that it is movable to different extents at two locations that are axially spaced, thus opening the aperture area present at these respective locations to a different extent in the operating state of the device. For example, in regions with high pressure, such as occur in axial locations of the flow channel that are distant from the volume flow inlet, the covering means will open a smaller nozzle gap between covering means and aperture area than in axial locations of the flow channel with lower pressure, such as occurs axially nearer the volume flow inlet of the flow channel. There, the opened nozzle gap is larger. In this way, a separating element extending in the flow direction can be advantageously utilized on the one hand with a relatively small axial extent of the device, which moreover is substantially supplied with the same part volume flow in each case in different axial locations. By way of this inventive measure, an axially highly homogeneous volume flow on the baffle area and thus an axially highly homogeneous separating performance are achieved. Here, the separating element comprises for example a baffle surface and/or a non-woven fabric, even combined with one another. With great advantage, a particularly efficient separation with optimal utilization of the entire axial length of the device is thus achieved on the whole.

As a further development of the invention it is provided that the flow channel has a cross-sectional area that decreases in the axial direction, in particular being designed so as to be conical. Because of the geometry of the flow channel according to the invention with cross-sectional area that varies, in particular decreases, in the flow direction, an adequate flow width is available for the cleaned volume flow at any given axial location of the device outside the flow channel. The part volume flows that emerge at the individual axial locations are added so that downstream more flow width is needed than upstream. This need is taken into account by the invention by way of the cross-sectional area of the flow channel which in return for the increased space requirement decreases, with the housing enclosing the device according to the invention maintaining approximately the same extent. Advantageously, a stagnation pressure of the cleaned mixture is thus also avoided, which would negatively affect the separating performance. According to the invention, the flow channel could not only be designed so as to be conical, but also in the manner of a pyramid shell or in addition to conical axial sections also comprise cylindrical ones.

As a further development of the invention it is provided that the aperture area is formed by the aperture area of a single aperture or by the sum of the respective part aperture areas of multiple part apertures axially following one another. The measure according to the invention of achieving a uniform separating performance via an axial extent of the flow channel with the help of axially extending aperture areas and a covering means that can be axially moved differently is solved according to the invention by multiple part apertures that are axially spaced from one another each with a part aperture area, and likewise by a single large aperture with a single aperture area, which in each case are designed so as to be axially covered by the covering means. It likewise conforms to the invention when multiple axial sections each with multiple part apertures with part aperture areas and each an assigned covering means are arranged radially distributed about the circumference of the flow channel, in particular in the form of aperture pairs, aperture triples or more. This can be effected radially uniformly, i.e. for example at an equidistant angular spacing of the axial sections relative to one another of 180°, 120° but also 90°, 72°, 60° or an even smaller radial spacing or radially non-uniformly. However, each individual axial section of the flow channel with its part aperture areas and part apertures is always designed herein so as to be covered by a covering means. For this reason, multiple covering means can also be provided circumferentially distributed for each axial section of the flow channel.

The effect of the device desired according to the invention can be even better achieved in that a cross section of the aperture area at a first axial location is designed so as to be smaller than a cross section of the aperture area at a second axial location located further away from the volume flow inlet. This takes into account the pressure conditions in the flow tube even better in that the axial region with high pressure and covering means that are already more difficult to move moreover have even smaller aperture area cross sections and thus deflect a more accurately determined, smaller part volume flow in the case that such a configuration is required due to the operation. Otherwise, the axial cross section of the aperture area according to the invention can also be configured so as to remain the same or even increase over the axial length of the flow channel.

In one configuration of the invention it is provided that a part aperture located axially closer to the volume flow inlet has a larger part aperture area than an axially more distant part aperture and not only a larger cross section. The same applies to the instance of a single aperture area according to the invention.

Because of the fact that an axial extent of a part aperture area is designed so as to be larger than a radial extent of the part aperture area, an optimal adaptation of the aperture area geometry to the situation respectively brought about by operating conditions of an engine and geometry of the entire separating device is advantageously made possible, in particular also by way of circular, oval or otherwise symmetrical or even unsymmetrical aperture geometries. Thus, an adequately large separating element is also achieved without enlarging the radial extent of the device. For example, the aperture can be configured as an elongated hole or as a slot introduced into the flow channel in the longitudinal direction.

In one configuration of the device it is provided that the covering means is configured so as to influence the part volume flow as a function of the magnitude of the volume flow or is configured so as to influence the part volume flow as a function of the pressure that is present at the given axial location of the flow channel or is configured so as to influence the part volume flow as a function of a rotational speed of the flow channel about the longitudinal axis thereof. In particular, in the case of a larger volume flow of a gas-liquid mixture, the covering means can cover, within the scope of the invention, the aperture(s) in the flow channel to a lesser extent or be arranged at a greater distance to the aperture/apertures than with a relatively smaller volume flow. The covering means is also configured so as to influence the part volume flow as a function of the pressure that is present at the given axial location. Within the scope of the invention, this can be achieved for example in that the covering means in axial locations of the flow channel covers the aperture area to a greater or lesser extent depending on the pressure present there. Finally, the covering means is additionally configured so as to influence the part volume flow as a function of a rotational speed of the flow channel about the longitudinal axis thereof. Because of this, the device can be integrated in a camshaft and control the covering means as a function of the rotational speed so that said covering means, for example utilizing centrifugal forces, in each case release a larger part volume flow through the respective aperture when the rotational speed increases.

Within the scope of the invention it is advantageous when the covering means comprises an elastic element, in particular a plate-like elastic element, most preferably a lamellar valve. This makes possible a self-regulating configuration and control of the covering means in that, because of the increase in the pressure accompanying an increase in the volume flow, a deflection of the elastic element takes place. In particular, an altogether elastic covering means or a hinge joint provided with a return spring can be the elastic element. If the covering means comprises a plate-like element, in particular a lamellar valve, it is designed in a particularly simple and sturdy manner in terms of construction.

As a further development of the invention it is provided that the plate-like elastic element is rotatably mounted about an axis of rotation transversely to the flow direction of the volume flow in the flow channel relative to the covered aperture area, wherein the plate-like elastic element is preferentially fixed at a downstream end—or at the axially most distant end—and/or the plate-like elastic element is deflectably arranged about an axis of rotation parallel to the flow direction. With the first mentioned fixing it is advantageously achieved according to the invention that because of the lever principles in downstream—axially more distant—regions of the flow channel an increased pressure with appropriate design leads to a reduced lever action and thus to a reduced torque. On the other hand, a correspondingly greater torque acts on the fixing point in regions further upstream in the flow channel in which a lower pressure is present. According to the invention, this is utilized in order to offset the different pressure conditions at different axial positions in the flow channel with the covering means according to the invention in such a manner that in each case comparable part volume flows exit from the aperture in the flow channel. On the other hand, in a preferred configuration of the invention, the plate-like element can be rotatably mounted about an axis of rotation parallel to the flow direction. For example, the plate-like elastic element can be clamped in so that it is deflectable about an axis of rotation that is oriented parallel to the flow direction. When according to this form of configuration a section of the plate-like elastic element covering the aperture area has a different spacing to the bearing point depending on the pressure conditions in different axial locations of the flow channel, different part volume flows can be advantageously released by the covering means taking into account the lever principles as a function of the pressure that is present at the given axial location.

In another preferred form of configuration of the invention the plate-like elastic element substantially consists of an elastically deformable material, wherein it is deflectably arranged about an axis of rotation transversely to the flow direction and/or about an axis of rotation parallel to the flow direction. Possible materials are for example spring platelets made of metal or plastic.

It is favorable in this connection when the stiffness of the elastically deformable material does not change or only insignificantly so in the temperature range in which the separator operates. This is the case in particular for metal.

When using an elastically deformable material for the plate-like elastic element it is sufficient to fix the same to the flow channel without a joint with return spring in order to function as deflectable covering means. The plate-like elastic element, in particular configured as spring platelet, is bent radially outward by the pressure that is present at the given axial location in order to open a defined nozzle gap above the respective (part) aperture area in the flow channel.

It is particularly advantageous when the plate-like elastic element has an elasticity that varies as a function of the distance to a fixing point. This can be achieved, on the one hand, in that the distance from the region covering the aperture area to the fixing point of the plate-like elastic element is selected differently in different axial locations in order to utilize different lever arms. On the other hand, the plate-like elastic element can for example have a profile that is variable with the distance to the fixing point in order to have a different stiffness, for example beads, reinforcing webs or such like.

FIG. 1 shows in a perspective and partly sectioned view a first configuration form of a separating device 1 according to the invention. The separating device 1 comprises a flow channel 5 with a circular cross-sectional area which conically tapers in the direction downstream, i.e. to the right, i.e. to a location that is axially more distant from the volume flow inlet 6 in FIGS. 1 to 3. By means of the volume flow inlet 6, the volume flow 2 enters the flow channel 5. This flow channel 5 has an aperture area 7 below the depicted covering means 11 which axially extends over the entire length of the covering means 11 and the width thereof, less a certain edge overlap in this case of 2 mm. Other distances, larger and smaller, are likewise possible according to the invention. The covering means 11 is supported by the wall of the flow channel 5 opened by the aperture area 7, which thereby simultaneously forms the edge of the aperture area 7. In addition, multiple part apertures 14 are provided which likewise extend axially. In other words, all aperture areas are oriented radially with respect to the through-flow direction and accordingly direct the deflected volume flow 2 in the direction of the separating element 3, which in this case is formed as a baffle surface 24 lined with a non-woven fabric 21. The separating element 3 concentrically surrounds the flow channel 5, being substantially configured as a cylindrical internal lateral surface. In this embodiment, the baffle surface 24 is entirely lined with non-woven fabric 21. However, completely or partly omitting the non-woven fabric 21, the latter for example in particular in the regions of the baffle surface 24, onto which the deflected part volume flows are not directly directed, would also be possible according to the invention. Regularly or irregularly alternating regions of baffle surface 24 and baffle surface 24 lined with non-woven fabric 21 are also possible according to the invention. The part apertures 14 with their part aperture areas 13 form additional aperture areas 7 of the device according to the invention. According to the invention, they can also be omitted since in this embodiment they merely ensure that even with the minutest loading of the device with volume flow its deflection and cleaning are ensured in the case that the same is not adequate for sufficiently lifting the covering means 11. The two visible part apertures 14 are located at a first and a second axial location 9, 10 and lie in an axial section of the flow channel 5. They are practically hardly covered by the covering means 11 which is formed as elastic element 17, more precisely as a lamellar valve 18, and mainly covers the aperture area 7 located below the same. The lamellar valve 18 is fastened to the flow channel 5 by means of a fastening means 22 and is thus moveable about an axis transversely to the flow direction. The fastening means 22 could be a screw or a clip connection which penetrates the covering means so as to hold the latter. The cleaned gas mixture leaves the device 1 via an undesignated outlet 23 (see FIG. 2).

Figure 2:
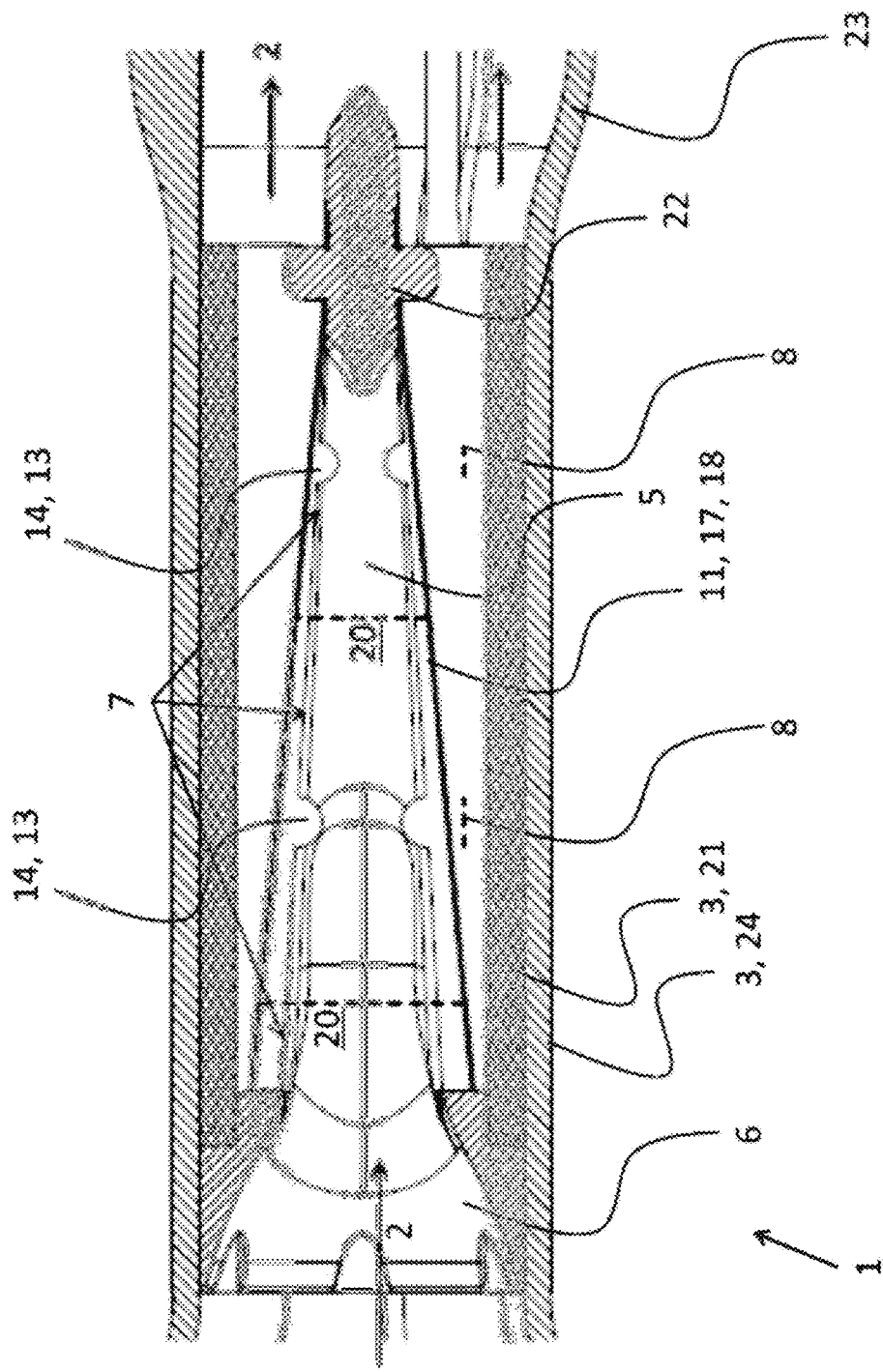
FIG. 2 is a vertical axial sectional view to a flow direction through line II-II of FIG. 1 of the example separating device.

FIG. 2 shows a vertical axial section to the flow direction through the separating device 1 according to the line II-II of FIG. 1. The volume flow 2, which enters from the left the flow channel 5 that is conically tapered and thus has a cross-sectional area 20 that decreases in the axial direction, is mainly deflected in each case by the aperture area 7 (not visible here) below the respective covering means 11, but also exits in a deflected manner through the part openings 14 in the direction of the baffle area 24 and, cleaned, leaves the device 1 at the outlet 23. Clearly evident is the width between baffle surface 24 and flow channel 5 that becomes larger because of the axially conical course of the flow channel 5 so that the part volume flows added up downstream get through the outlet 23 without major stagnation pressure. Two part apertures 14 in each case are arranged radially symmetrically about the flow channel 5 in this embodiment and therefore form a part aperture pair of the same type of part apertures at the respective axial location. Thus, this embodiment comprises two covering means 11 with an axially extending aperture area 7 covered in each case by said covering means 11 and which are not easily detectable in this view, indicated in FIG. 2. It additionally comprises two pairs of part aperture areas 13 which are hardly covered or not at all and which therefore do not primarily count among the combination according to the invention of axially extending aperture area 7 and covering covering means 11. It is evident that the cross section 8 of the part apertures 14 varies with their axial location, namely becomes smaller with increasing axial distance from the volume flow inlet 6. Because of this, the corresponding part aperture area 13 also becomes smaller. The respective covering means 11 is formed by an elastic element 17 of an elastically deformable material such as for example metal or plastic. It is fixed, in each case, at the downstream end of the flow channel 5 by means of a fastening means 22, which is designed as a clip-on element here, which penetrates the respective covering means 11. Between each elastic element 17 and the flow channel 5 a nozzle gap is created at the aperture area 7 in this way. Because of the fixing of the elastic element 17 by means of the fastening element 22 on the flow channel 5 at its downstream end, each elastic element 17 or lamellar valve 18 is bendable about an axis transversely to the flow direction, in order to vary the nozzle gap.

Figure 3:
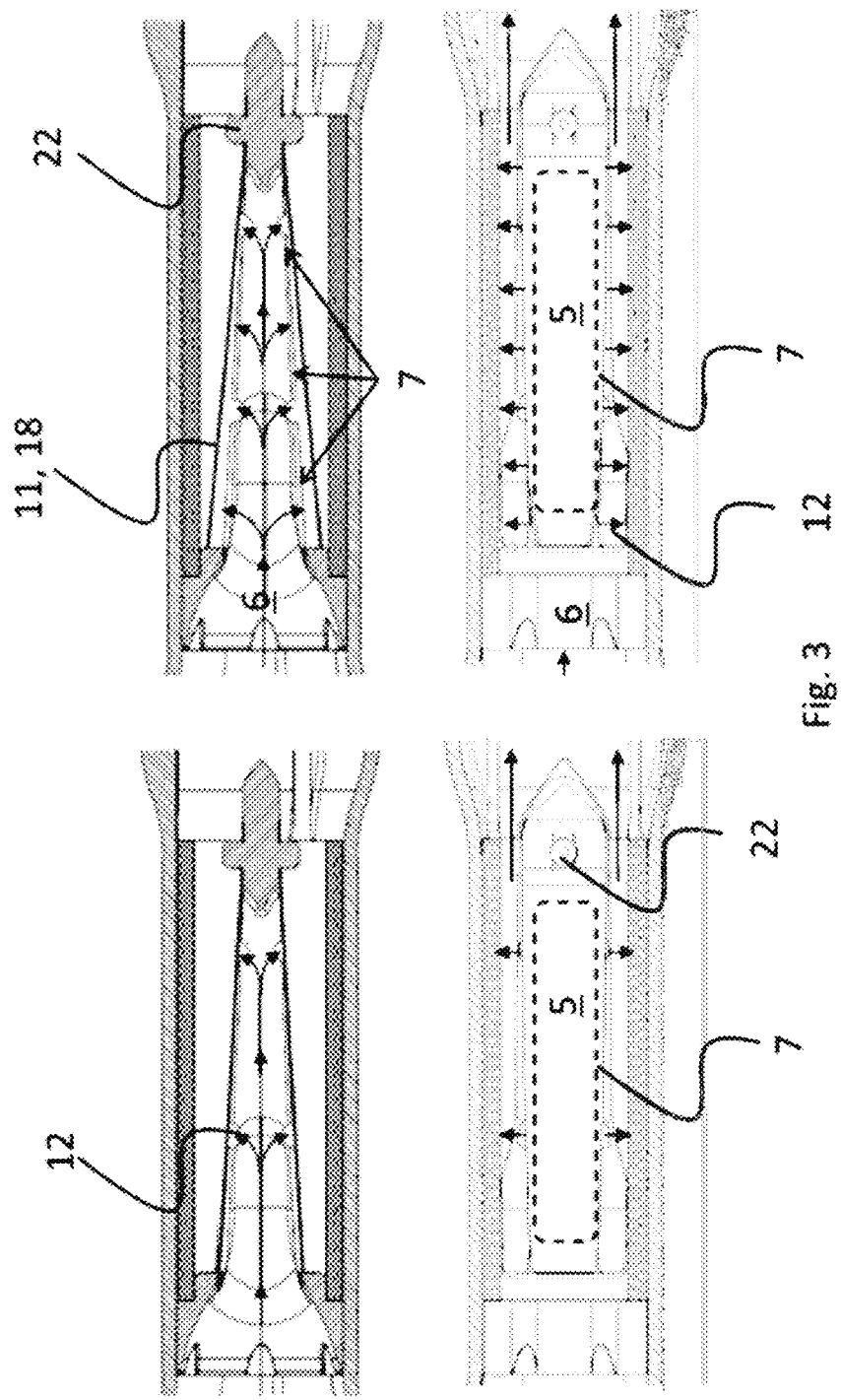
FIG. 3 is a schematic view of an example mode of operation of the example separating device of FIGS. 1 and 2.

FIG. 3 shows the mode of operation of the separating device 1 according to the first embodiment. Therein, the two images in the left column show the separating device 1 in a state with a smaller volume flow 2 and the two representations in the right column show the separating device 1 in a state with relatively higher volume flow 2. Here, the volume flow 2 is indicated by arrows which in each case exemplarily symbolize one of the many part volume flows 12. With respect to the perspective, the representations in the top line correspond to FIG. 2 whereas the representations in the bottom line show a representation of the separating device 1 rotated about the longitudinal axis in comparison thereto, in the case of which the aperture area 7 indicated with a dashed line is arranged below the depicted covering means 11 (as in FIG. 1). For the sake of clarity, only some reference numbers are shown. In the state of the separating device 1 shown in the left column, with a through-flow with lower volume flow 2, it is evident that the covering means 11 formed as lamellar valves 18 are not lifted off by the volume flow because of the relatively low pressure in the interior of the flow channel 5 and therefore sealingly cover the aperture area 7 located below. The part volume flows 12 exit through the part apertures 13. The operating state with significantly larger volume flow 2 represented in the right column shows that the part volume flows 12 now mainly exit through the nozzle gap which was created over approximately the entire axial length of the flow channel 5 by lifting the covering means 11 off the aperture area 7 extending therebelow. It is also evident that the respective covering means 11 is deflected to various degrees from its rest position in axially different locations and thus covers the axially more distant parts of the aperture area 7 to a greater extent than the axially nearer parts. The conical course of the flow channel 5 additionally increases the axial pressure differential a little so that in this embodiment larger part apertures are arranged axially nearer, which allow the passing of a larger part volume flow 12. This results in an axially uniform volume flow distribution over the separating medium or the separating element which advantageously comprises at least one baffle surface or a non-woven fabric and consequently an improved separating performance.

Because of the elastic deformability of the lamellar valve 18 its distance to the aperture area 7 adjusts itself in a self-regulating manner. The self-regulation materializes because the forces acting on the lamellar valve 18 have a longer lever distance to the fastening means 22 than is the case at an axially more distant location.

The separating device 1 according to the first embodiment can be rotated about its longitudinal axis, for example when it is arranged in the interior of a camshaft. In this case, the lamellar valves 18 are additionally deflected because of centrifugal forces in order to enlarge the distance and thus the nozzle gap at higher rotational speeds. This effect is superimposed on a deflection because of the pressure that is present in the flow channel.

Figure 4:
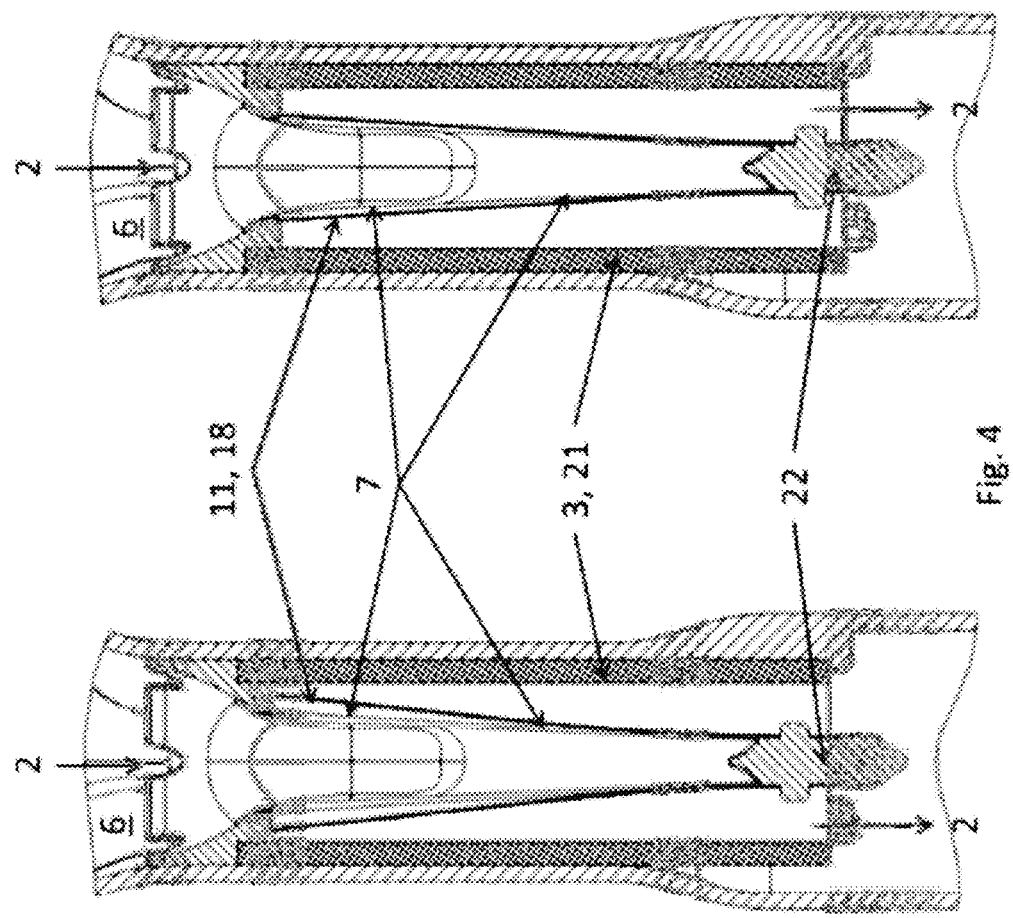
FIG. 4 is a top sectional view of another example separating device.

FIG. 4 shows an embodiment of the invention, in which the part openings with rigid cross sections are not present. Otherwise this embodiment does not differ from the one described before.

Figure 5:
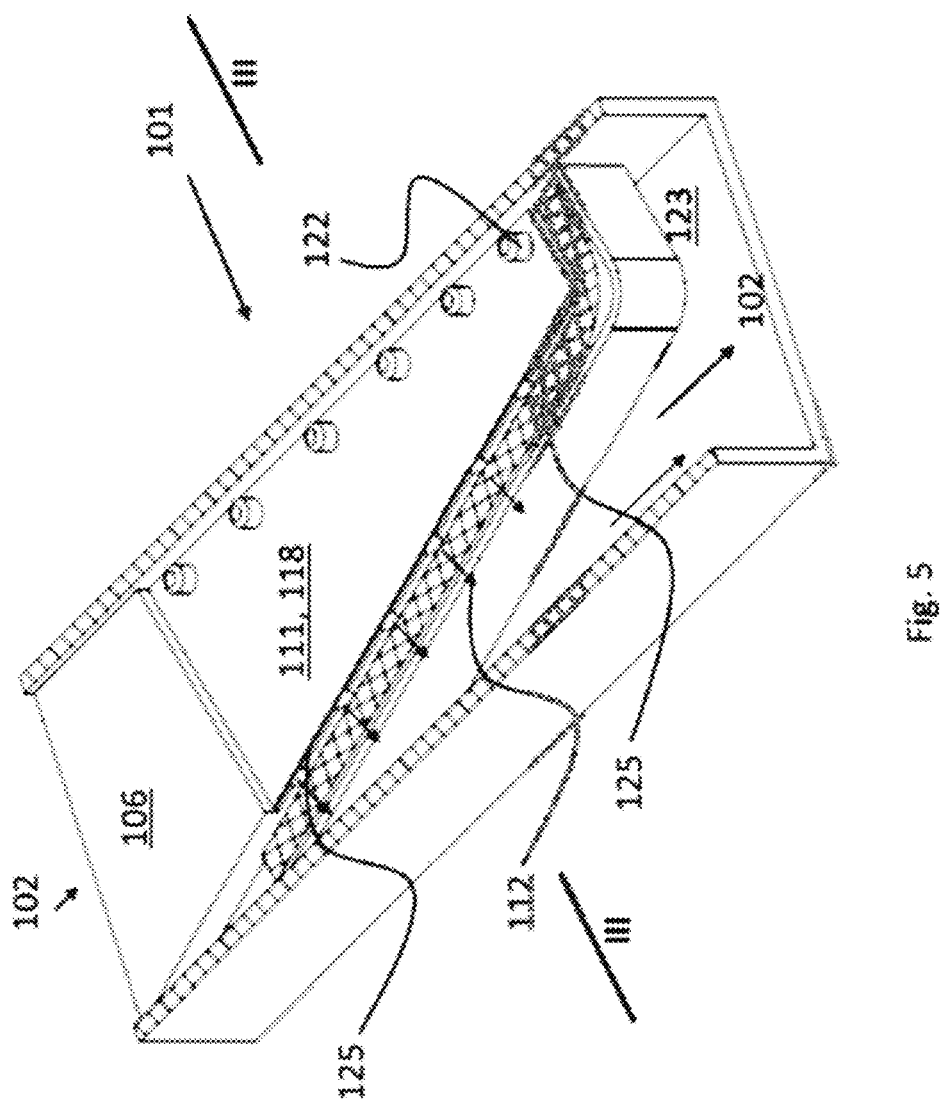
FIG. 5 is a perspective view of a part section through still another example separating device.

FIG. 5 shows a second embodiment 101 of the invention in a perspective view in a part section. Obscured features are not marked with reference numbers. A volume flow 102 enters the device, is deflected and, cleaned, exits at the outlet 123. Here, in contrast with the first embodiment, the aperture area located below the covering means 111 is formed by a single aperture of the narrowing flow channel, which towards the top, towards the covering means 111, is designed so as to be open and in its height remains the same over its axial course. As depicted, smaller part apertures can also be provided in the wall of the flow channel in this embodiment in order to make possible a certain basic volume flow even without deflection of the covering means 111. Here, in contrast with the first embodiment, the same is moveable about an axis which runs parallel to the volume flow 102 in the flow channel. Just as with the first embodiment, however, the lamellar valve 118 can be moved axially in a different manner. At a given axial location it has a certain distance from its free end 125 to the respective fastening means 122. At another, axially more distant, location, this distance is smaller so that reduced lever lengths also exist there, and therefore despite the higher pressure in the flow channel no further lifting-off of the covering means 111 from the aperture takes place. Here, too, the axially added part volume flows 12 are given a greater width in the direction of the outlet 123.

The details of this embodiment including their mode of operation are evident in the section representations according to FIG. 5, which show a section along the line III-Ill from FIG. 4 through the separating device 101.

The flow channel 105 of the separating device 101 is opened with an aperture area 107 towards the top, which aperture area 107 is sealed off with a lamellar valve 118 made of an elastically deformable material. The lamellar valve 118 is fixed on the flow channel 105 on an edge running in the flow direction and, because of the elasticity of said edge, can thus be deflected about an axis that is oriented transversely to the flow direction. The flow channel 105 with covering means 111 is surrounded by a separating element 103 which comprises a baffle surface 126 which is lined with a non-woven fabric 121. Here, the separating element 103 can also be configured as described as variations according to the invention regarding the first embodiment. The described arrangement of the flow channel, of the baffle surface lined with non-woven fabric and of the covering means is surrounded by a hollow cuboid housing 124.

Shown are two different operating states in the same axial location. The above representation shows a state with relatively low volume flow and the lower representation a state with relatively higher volume flow.

As is evident in the upper part of FIG. 6 a lower volume flow at a given axial location only results in a very small deflection of the lamellar valve 118 at this location. This is attributable to the fact that because of the relatively low pressure in the interior of the flow channel 105 only comparatively small forces act on the elastically deformable lamellar valve 118 for its deflection. The degree of the deflection and thus concomitantly the magnitude of the opened nozzle gap between aperture area 107 and lamellar valve 118 is dependent, because of the lever principles, on the distance to the fastening means 122 which defines the fixing point and fulcrum. Because of this, a deflection of the free end 125, or expressed in other words of the outer edge, of the lamellar valve 118 is greater axially nearer the volume flow inlet 106 than axially further distant with a given volume flow. This results in that, axially nearer, a larger part volume flow can exit the flow channel 105 than in an axially more distant region. As a result, substantially the same part volume flow will strike the baffle surface 126 lined with non-woven fabric 121 in locations of the flow channel 105 located further downstream as further upstream despite the higher pressure present there.

The lower part of FIG. 6 shows the separating device 101 in a state of the through-flow with a larger volume flow as compared with the upper part of FIG. 5. This is evident because of the fact that the deflection of the free end 125 of the lamellar valve 118 is larger at this axial location because of the higher pressure. As already mentioned, the deflection of the covering means 111 also varies along the axial extent of the narrowing flow channel 105 at a certain volume flow since the regions of higher pressure are also regions in which the deflection is smaller because of a smaller lever, so that the opened aperture area, viewed axially, decreases, so that the part volume flows remain approximately the same or a uniform volume flow distribution is achieved. Because of this, a particularly homogeneous and efficient separation of the oil is achieved.

Advantageously, both the separating device 1 according to FIGS. 1 to 3 and also the separating device 101 according to FIGS. 4 and 5 are self-regulatory in any respect. This is because, due to the elastic deformability of the lamellar valve 118, an adaptation of the deflection to variations of the volume flow 2, 102 is achieved on the one hand at a given axial location of the flow channel 5, 105, while on the other hand the deflection of the lamellar valve 118 also adapts to the pressure conditions that are variable over the axial course of the flow channel 5, 105, in order to compensate for these and in each case generate a uniform part volume flow in the direction of the separating element 3, 103.

LIST OF REFERENCE NUMBERS

1 Separating device, first embodiment
2 Volume flow
3 Separating element
4 Deflection arrangement
5 Flow channel
6 Volume flow inlet
7 Aperture area
8 Cross section
9 First axial location
10 Second axial location
11 Covering means
12 Part volume flow
13 Part aperture area
14 Part apertures
15 Axial extent
16 Radial extent
17 Elastic element
18 Lamellar valve
19 Flow direction
20 Cross-sectional area flow channel
21 Non-woven fabric
22 Fastening means
23 Outlet
24 Baffle surface
101 Separating device, further embodiment
102 Volume flow
103 Separating element
104 Deflection arrangement
105 Flow channel
106 Volume flow inlet
107 Aperture area
108 Cross section
109 First axial location
110 Second axial location
111 Covering means
112 Part volume flow
113 Part aperture area
114 Part apertures
115 Axial extent
116 Radial extent
117 Elastic element
118 Lamellar valve
119 Flow direction
120 Cross-sectional area flow channel
121 Non-woven fabric
122 Fastening means
123 Outlet
124 Housing
125 Free end
126 Baffle surface

What is claimed is:

1. A device for separating liquid from a volume flow of a gas-liquid mixture, the device comprising:
a separating element;
a deflection arrangement for deflecting the volume flow in a direction of the separating element to precipitate liquid on the separating element and thereby separate the liquid from the volume flow, wherein the deflection arrangement comprises a flow channel with a volume flow inlet, the flow channel extending axially away from the volume flow inlet and comprising an aperture area that extends axially on the flow channel; and
covering means that at least partly covers the aperture area and is movable relative to the aperture area, with the covering means being movable to different extents at two axially-spaced locations to influence a magnitude of a part volume flow of the deflected volume flow such that the magnitude of the part volume flow that flows out of the flow channel through the aperture area is different at a first axial location than at a second axial location,
wherein the covering means comprises an elastic element.

2. The device of claim 1 wherein the flow channel has a cross-sectional area that decreases in an axial direction.

3. The device of claim 1 wherein the flow channel is conical.

4. The device of claim 1 wherein the aperture area consists of an area of a single aperture.

5. The device of claim 1 wherein the aperture area is comprised of a sum of areas of multiple part apertures following one another in an axial direction.

6. The device of claim 1 wherein a first cross section of the aperture area at the first axial location is smaller than a second cross section of the aperture area at the second axial location, wherein the second axial location is farther from the volume flow inlet than the first axial location.

7. The device of claim 1 wherein a first part aperture that is axially closer to the volume flow inlet has a larger part aperture area than a second part aperture that is axially farther from the volume flow inlet.

8. The device of claim 1 wherein an axial extent of a part aperture area is larger than a radial extent of the part aperture area.

9. The device of claim 1 wherein the covering means is configured to influence the part volume flow based on a magnitude of the volume flow.

10. The device of claim 1 wherein the covering means is configured to influence the part volume flow based on a pressure present at an axial location of the flow channel.

11. The device of claim 1 wherein the covering means is configured to influence the part volume flow based on a rotational speed of the flow channel about a longitudinal axis thereof.

12. The device of claim 1 wherein the covering means comprises a lamellar valve.

13. The device of claim 1 wherein the elastic element is rotatably mounted about an axis of rotation transversely to a flow direction of the volume flow relative to the aperture area that is covered by the covering means.

14. The device of claim 13 wherein the elastic element is at least one of fixed at a downstream end or rotatably mounted about an axis of rotation parallel to the flow direction.

15. The device of claim 1 wherein a majority of the elastic element is comprised of an elastically-deformable material, wherein the elastic element is deflectably disposed about an axis of rotation transversely to a flow direction of the volume flow.

16. The device of claim 1 wherein a majority of the elastic element is comprised of an elastically-deformable material, wherein the elastic element is deflectably disposed about an axis of rotation parallel to the flow direction of the volume flow.

17. The device of claim 1 wherein a majority of the elastic element is comprised of an elastically-deformable material, wherein the elastic element is deflectably disposed about an axis of rotation transversely to a flow direction of the volume flow and about an axis of rotation parallel to the flow direction of the volume flow.

18. The device of claim 1 wherein the elastic element has an elasticity that varies based on a distance to a fixing point.

* * * * *